United States Patent [19]

Seer, Jr.

[11] 4,064,529
[45] Dec. 20, 1977

[54] APPARATUS FOR AUTOMATIC COLOR BALANCING OF COLOR TELEVISION SIGNALS

[75] Inventor: Harold George Seer, Jr., Woodbury, N.J.

[73] Assignee: RCA Corporation, New York, N.Y.

[21] Appl. No.: 706,451

[22] Filed: July 19, 1976

[51] Int. Cl.² .............................................. H04N 9/04
[52] U.S. Cl. ................................................... 358/29
[58] Field of Search ........................................ 358/29

[56] References Cited
U.S. PATENT DOCUMENTS

| Re. 28,774 | 4/1976 | Kabota et al. | 358/29 |
| 3,786,177 | 1/1974 | Bazin | 358/29 |

Primary Examiner—Robert L. Richardson

Attorney, Agent, or Firm—Eugene M. Whitacre; Mason DeCamillis

[57] ABSTRACT

A plurality of signal storage means are used to store, respectively, the peak signal value of the red, blue and green video signals of a color television camera for comparison against a predetermined signal level representing a desired combined signal condition, such as black. The peak values of the stored video signals are combined to ascertain the difference in peak signal amplitude between the red and green signals and the blue and green signals. Control signals developed from the difference signals adjust the respective red and blue channel signal levels so as to match the red and blue signal level to the green signal level to yield the desired combined signal condition.

6 Claims, 1 Drawing Figure

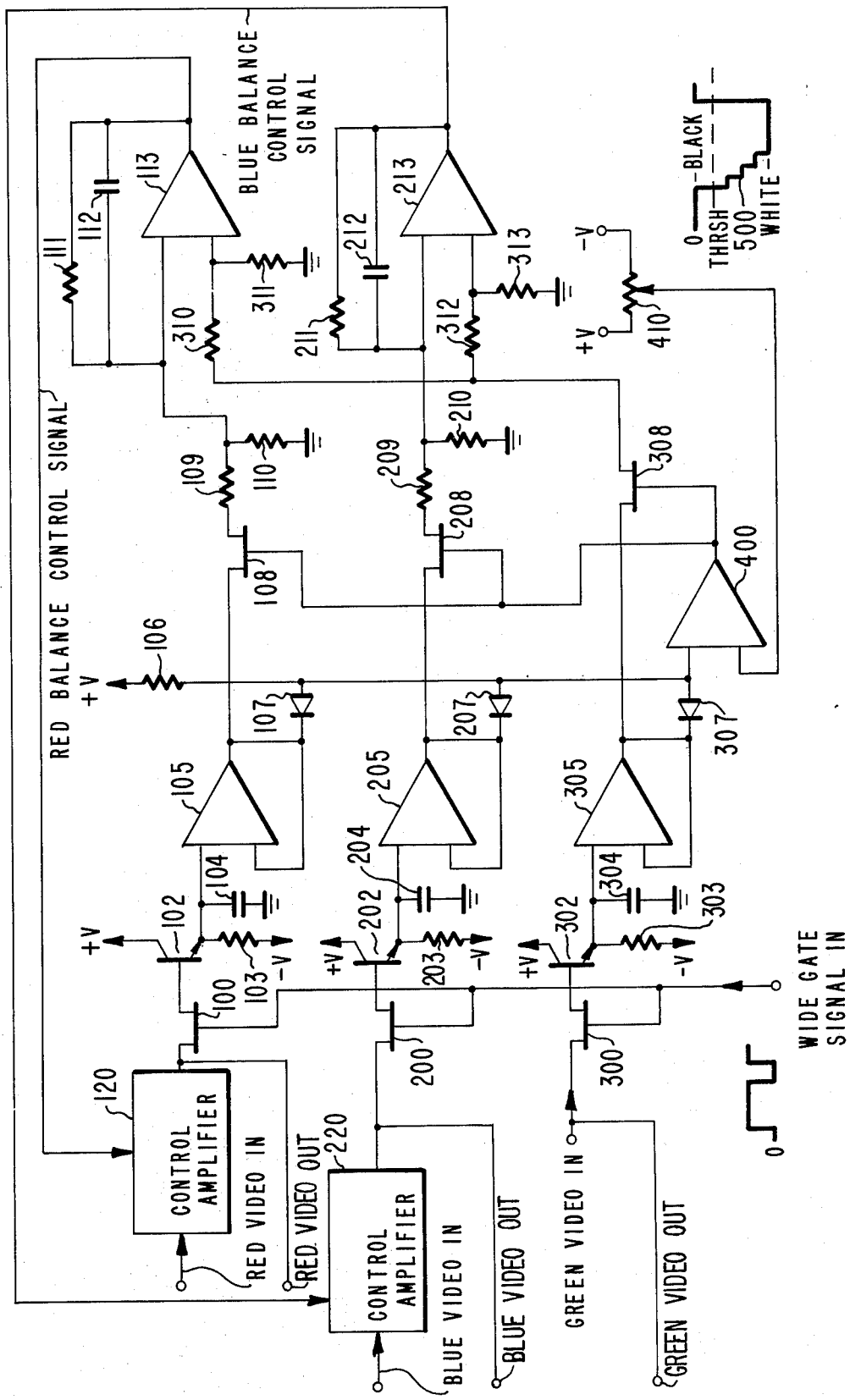

APPARATUS FOR AUTOMATIC COLOR BALANCING OF COLOR TELEVISION SIGNALS

BACKGROUND OF THE INVENTION

This invention relates to apparatus for automatic color balancing of color television signals.

Automatic color balancing has been used to adjust black levels and gains of the red and blue color signals relative to those of the green signals in the signal processing channels following a television camera. Automatic color balancing is particularly advantageous in a telecine camera where the program material has been recorded on motion picture film which may be filmed under widely varying lighting conditions and further subjected to subsequent processing resulting in a wide variation of density and color from scene to scene.

Automatic color balancing, as shown in U.S. Pat. No. 3,786,177, entitled, APPARATUS FOR AUTOMATIC COLOR BALANCING OF TELEVISION CAMERA SIGNALS, has been used to ascertain when substantially black or substantially white signals are to be provided to the colorplexer of a television camera chain. However, there are circumstances during which this circuitry undercorrects, overcorrects or produces a color unbalance. Briefly described, the apparatus of U.S. Pat. No. 3,786,177 compares the amplitude of the red, blue and green color signals against an adjustable threshold level, such as represents black. A gating pulse is generated whenever all three color signals are below this threshold level. The amplitude of the red, blue and green signals at the time of the gating pulse are integrated to develop control signals representative of the average error between the blue and green and red and green signals. These control signals are coupled into a feedback loop to level controlled amplifiers in the red and blue color channels, and balance is achieved when the feedback loop causes the three average color signals to become equal in level. If, for any reason, the relationship between the average of the three color signals below the threshold level does not equal the peak value of each of the color signals below the threshold level, a substantially true signal balance for black will not be achieved. Incorrect black balance, under this type of circuit operation, may be readily understood by the following example in which the scene being observed by the camera contains a background consisting of a deeply folded red curtain. Under illumination, the leading edges of the red curtain folds will appear red in color while the deep recess of the folds will be nearly black due to lack of illumination. A video signal from a scene, such as described, will have a lower than proper ratio of red when the three color signals are averaged resulting in an improper black balance in which the deep recesses of the curtain folds will appear to be of cyan color rather than black.

SUMMARY OF THE INVENTION

Automatic color balancing apparatus is provided which comprises means for providing separate signal translating channels for two different color representative video signals of the same scene. Control means responsive to a control signal are included in one of the signal translating channels to alter the signal level of the channel for black balance or the gain characteristic of the channel for white balance. Means are coupled to the signal translating channels for storing the signal amplitude levels of the two signals. Threshold means are coupled to the storage means for determining when the two stored signals exceed a predetermined threshold. Means are coupled to the storage means, to the threshold means and to the signal translating channels for developing a control signal representative of the differential amplitude between the two signals when the two signals exceed the predetermined threshold. The control signal is applied to the control means for altering the signal level for black balance or the gain characteristic for white balance of the one signal translating channel in a direction so as to make the respective level or amplitude of the two signals equal.

BRIEF DESCRIPTION OF THE DRAWING

The sole FIGURE is a block diagram of automatic color balancing apparatus for black level in accordance with the invention.

DESCRIPTION OF THE INVENTION

In the FIGURE, a red video signal is coupled to the input terminal of control amplifier 120. The output terminal of control amplifier 120 is coupled to an input terminal of a field effect transistor coupled as a semiconductor gate 100. The output terminal of gate 100 is, in turn, coupled to the base electrode of a transistor driver 102, the collector of which is coupled to a source of voltage +V. The emitter of transistor 102 is coupled by means of a resistor 103 to a source of voltage −V. The junction of the emitter of transistor 102 and resistor 103 provides an output terminal to which is coupled to a storage capacitor 104 and an amplifier 105 arranged in a voltage follower configuration. Insofar as described, gate 100, transistor 102, capacitor 104 and voltage follower 105 comprise a signal storage circuit for storing the peak value of the signal applied to the input terminal of gate 100. The blue video signal is applied to a similar storage circuit 200, 203, 204, 205 by means of control amplifier 220, while the green video circuit is shown as being directly coupled to storage circuit 300, 302, 304, 305. In operation, a gate enabling signal, in the form of a wide gate signal, is applied to gates 100, 200, 300. The wide gate signal is proportioned and timed to occur during the active video signal duration so as to inhibit gates 101, 102 and 103 during edge portions of the picture to prevent shading and edge transient phenomena from affecting the true peak value of the video signal being stored in the respective storage circuits.

The output terminals of voltage followers 105, 205, 305, at which D.C. signals representative of the stored peak value of the red, blue and green input signals appear, are coupled to an AND gate comprising, respectively, diodes 107, 207, 307, and a resistor 106 coupled to a source of voltage +V, and to differential amplifiers 113 and 213 by means of gates 108, 208 and 308. The output terminal of the AND gate comprising diodes 107, 207, 307 is coupled to one input terminal of a comparator 400. The other input terminal of comparator 400 is coupled to a source of reference potential 410. Reference potential 410 provides a threshold value, as illustrated in waveform 500. In operation, when all of the stored peak input signals exceed the threshold voltage 410 applied to the comparator 400, an output signal from the AND gate causes comparator 400 to change state; i.e., go positive, thereby enabling gates 108, 208 and 308. The output signal of gate 308 is representative of the stored peak green video signal and is coupled to one input each, of differential amplifiers 113 and 213, where the signal provides a green reference signal. The other inputs of differential amplifiers 113 and 213 receive the stored signal representative of the peak red and blue video signals, respectively.

Input resistors 109-110, 209-210 and feedback networks 111-112, 211-212 coupled from the gate controlled input of amplifiers 113 and 213, respectively, to the output terminals of their respective amplifiers, each provide a sample and hold circuit for establishing a corresponding red and blue balance control signal. A feedback path from the output terminals of amplifiers 113 and 213 to respective control amplifiers 120 and 220 completes the circuit for automatic color balance by matching the peak negative red and blue video signals to the peak negative green video signal in accordance with the value of the red and blue control signals.

In summary, when the peak value of the red, blue and green video signals all exceed the threshold established for black level at the input of comparator 400, the comparator enables gates 108, 208 and 308, which couples the peak detected red, blue and green video signals to differential amplifiers 113 and 213. The red peak and blue peak signals are compared with the green peak signal, as a reference, to provide a red and blue balance control voltage. The feedback path from the output terminals of amplifiers 113 and 213 to control input amplifiers 120, 220 will result in a closed loop operation to achieve a balance between the peak values of the input red, blue and green video signals, which provides a true black balance.

In a similar arrangement, the apparatus of FIG. 1 may be effectively utilized to achieve a white balance signal by inverting the input red, blue and green signals and adjusting the threshold level to comparator 400 close to the maximum white level, rather than for the black level, as illustrated on curve 500. For white balance, the control signals are utilized to alter the gain characteristics of amplifiers 120 and 220 to match the amplitudes of the input red, blue and green signals.

The following component designations and values have been employed in automatic color balancing apparatus embodying the invention:

| | |
|---|---|
| Gates 100,108,200,208,300,308 | RCA CD4016AD |
| Amplifiers 105,205,305,400,113,213 | Motorola MC3403 |
| Diodes 107,207,307 | IN914 |
| Resistors 109,209,310,312 | 2 Kilohms |
| Resistors 103,203,303 | 1 Megohm |
| Resistors 110,210,311,313 | 200 Kilohms |
| Resistors 111,212 | 1 Megohm |
| Resistor 106 | 47 Kilohms |
| Capacitors 104,204,304,112,212 | 1 μfd |
| Voltage +V | 10 Volts |
| Voltage −V | 10 Volts |

What is claimed is:

1. Automatic color balancing apparatus comprising:
    means providing separate signal translating channels for two different color representative video signals of the same scene;
    level control means responsive to a control signal included in one of said signal translating channels;
    means coupled to said signal translating channels for storing the signal amplitude levels of said two signals;
    threshold means coupled to said means for storing for determining when said two stored signals exceed a predetermined threshold;
    means coupled to said storage means, said threshold means and to said signal translating channels for developing a control signal representative of the differential amplitude between said two signals when said two signals exceed said predetermined threshold; and
    means for applying said control signal to said level control means for altering the level of said one signal translating channel in a direction so as to make the level of said two signals equal.

2. Automatic color balancing apparatus for color television apparatus of the type producing at least three video signals representative of three different colors, comprising:
    means providing separate signal translating channels for each of said video signals;
    first level control means included in one of said signal translating channels, second level control means included in another of said signal translating channels, said first and second level control means responsive to control signals to alter the levels of said translating channels;
    means for storing the signal amplitude levels of said video signals;
    threshold means for determining when all of said stored video signals exceed a predetermined threshold;
    means coupled to said storage means, said threshold means and to said signal translating channels for developing at least two control signals, respectively, representative of the difference in level between the first and second and the second and third of said stored video signals when all of said stored video signals exceed said predetermined threshold; and
    means for applying said control signals, respectively, to said first and second level control means for altering the level of their respective signal translating channel in a direction so as to make said video signals equal.

3. The apparatus of claim 2, wherein said storage means includes a memory circuit comprising a semiconductor gate coupled to a peak detector circuit, said gate being operable during the occurrence of said video signals.

4. The apparatus of claim 2, wherein said first, second and third video signals are Red (R), Green (G) and Blue (B) and said first difference signal is R-G and said second difference signal is B-G.

5. Automatic color balancing apparatus comprising:
    means providing separate signal translating channels for two different color representative video signals of the same scene;
    gain control means responsive to a control signal included in one of said signal translating channels;
    means coupled to said signal translating channels for storing the signal amplitude levels of said two signals;
    threshold means coupled to said means for storing for determining when said two stored signals exceed a predetermined threshold;
    means coupled to said storage means, said threshold means and to said signal translating channels for developing a control signal representative of the differential amplitude between said two signals when said two signals exceed said predetermined threshold; and
    means for applying said control signal to said gain control means for altering the gain characteristic of said one signal translating channel in a direction so as to make the amplitude of said two signals equal.

6. The apparatus of claim 5, wherein said storage means includes a memory circuit comprising a semiconductor gate coupled to a peak detector circuit, said gate being operable during the occurrence of said video signals.

* * * * *

Disclaimer 4,064,529.—*Harold George Seer, Jr.,* Woodbury, N.J. APPARATUS FOR AUTOMATIC COLOR BALANCING OF COLOR TELEVISION SIGNALS. Patent dated Dec. 20, 1977. Disclaimer filed Dec. 7, 1984, by the assignee, *RCA Corp.*

Hereby enters this disclaimer to claims 1, 2, 4 and 5 of said patent.
[*Official Gazette February 12, 1985.*]